April 25, 1961 H. L. YAGER 2,981,524
PORTABLE MIXER

Filed July 28, 1958 2 Sheets-Sheet 1

INVENTOR.
HARRY L. YAGER
BY
BUCKHORN, CHEATHAM & BLORE
ATTORNEYS

April 25, 1961

H. L. YAGER 2,981,524

PORTABLE MIXER

Filed July 28, 1958

INVENTOR.
HARRY L. YAGER
BY
BUCKHORN, CHEATHAM & BLORE
ATTORNEYS

United States Patent Office 2,981,524
Patented Apr. 25, 1961

2,981,524
PORTABLE MIXER
Harry L. Yager, 030 SW. Ridge Drive, Portland, Oreg.
Filed July 28, 1958, Ser. No. 751,294
4 Claims. (Cl. 259—177)

My present invention comprises a portable mixer for mixing concrete, powders, granulated materials, liquids and solids, pastes, or any mixable materials. While it is probable that the greatest use of the present invention will be in the mixing and placing of concrete, the invention has already been put to other uses such as the mixing of ores with reducing substances and fluxes, and many other uses are possible.

The principal object of the present invention is to provide a mixer which may be manually shifted about, while the mixing drum is rotating, whereby laborious operations are eliminated. With the present invention a batch of materials may be deposited in the mixing drum and mixed while the mixer itself is moved to the dumping point, thus eliminating the usual transfer of the mixed materials to wheelbarrows, buckets or other transportation means. The reduction of man hours thus accomplished materially decreases the cost of many operations.

A further object of the present invention is to provide a portable mixer of the wheelbarrow type which is sturdy and stable, being extremely difficult to be accidentally tipped over while being moved. The present invention eliminates a great deal of wastage in materials.

A further object of the present invention is to provide a mixer of the foregoing character which is very inexpensively and quickly fabricated with a minimum of parts.

The foregoing and other objects and advantages of the present invention will be readily apparent from inspection of the following specification taken in connection with the accompanying drawings wherein like numerals refer to like parts throughout.

Figure 1:
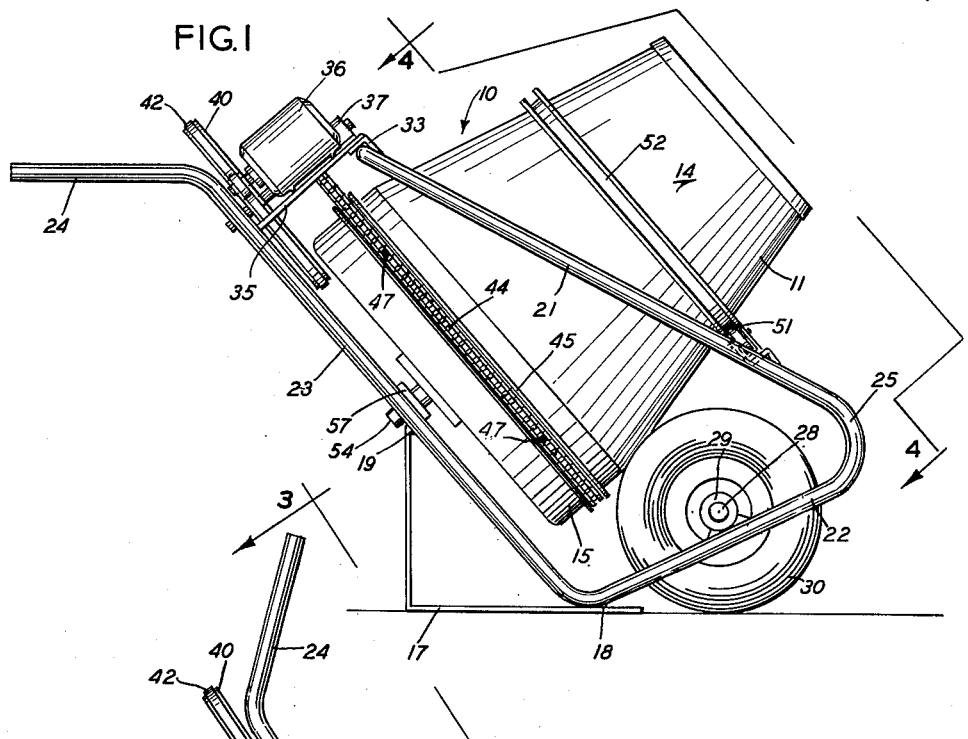
Fig. 1 is a side elevation of the present invention resting in a stationary position for the reception of materials or for the mixing of materials therein.
Figure 2:
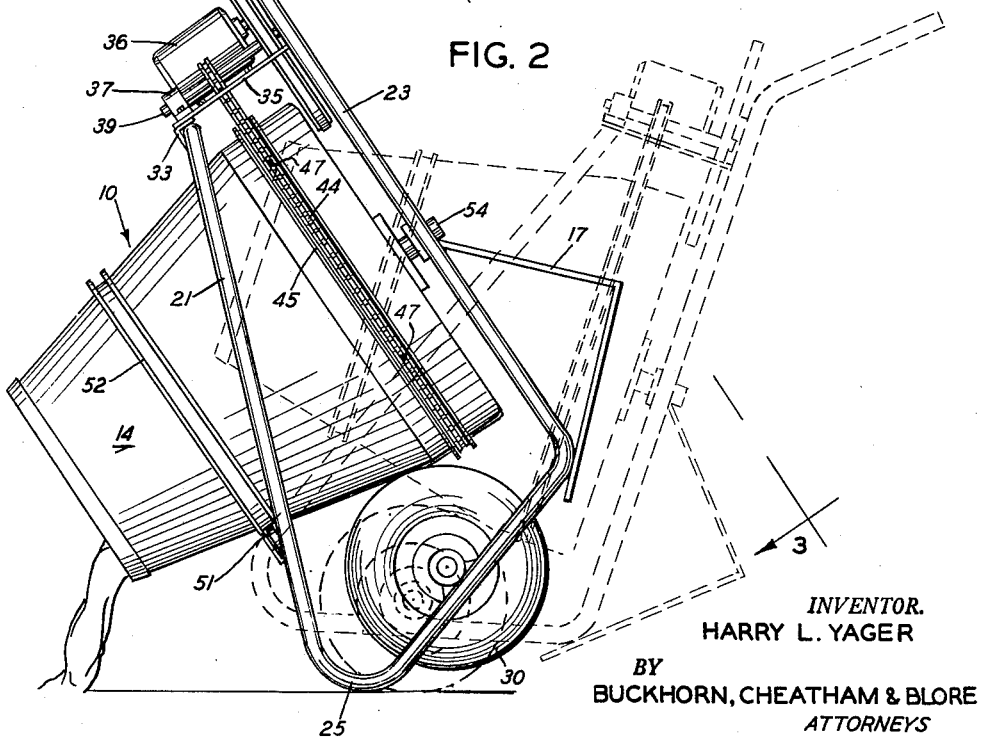
Fig. 2 is a side elevation of the present invention showing the mixer in dumping position in full lines, and in traveling position in dash lines.
Figures 3, 4:
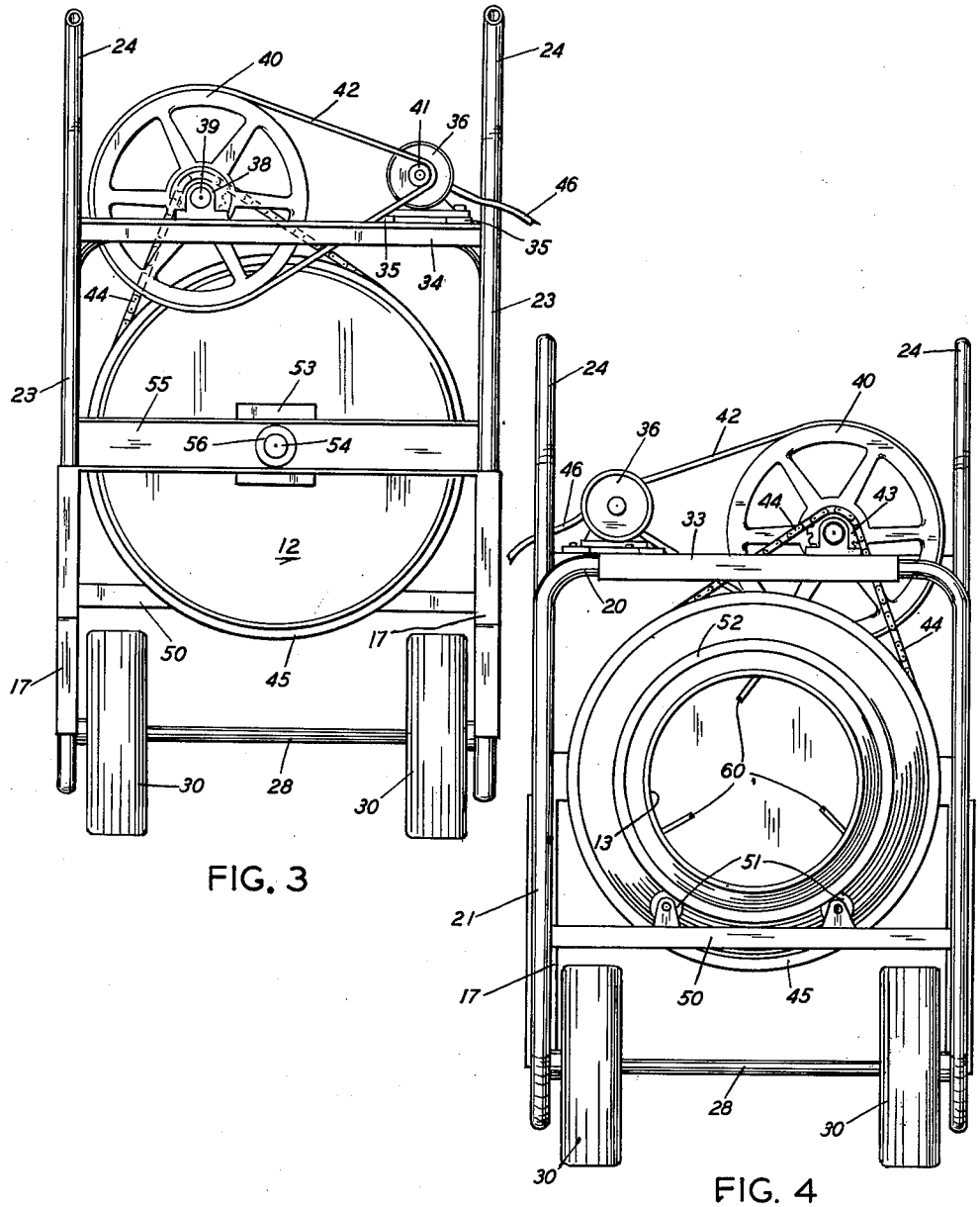
Fig. 3 is a rear elevation of the mixer looking from the plane of the line 3—3 of Fig. 2.
Fig. 4 is a front elevation of the mixer looking from the plane of the line 4—4 of Fig. 1.

The mixer comprises a drum generally indicated at 10, the drum having a continuous side wall 11 arranged concentrically about an axis of revolution, a bottom wall 12 and an open end 13. The side wall 11 preferably comprises a frusto-conical section 14 tapering toward the open end and joining a relatively small, cylindrical section 15 adjacent the bottom wall 12. The drum is rotatably mounted, with its open end elevated when in resting position, in a frame including a laterally spaced pair of transversely aligned supports 17, one at each side of the drum and below the drum. The supports 17 comprise relatively wide, metal bars having their forward ends welded to other frame members at 18, and rear portions extending upwardly and welded to the frame members at 19. The supports 17 are positioned outwardly from the lateral limits of the drum and below the center of mass of the drum and its contents so as to support the mixer in stable equilibrium when it is stationary and being loaded or rotating to mix the contents of the drum.

These supports form portions of a frame, the major portion of which is fabricated of a single length of pipe. The pipe is bent to provide a horizontal, laterally extending, central portion 20 which extends transversely above the rear end of the drum. From the central portion extend a pair of pipe sections, one at each side of the drum, and each including a forward portion 21 extending downwardly and forwardly, adjoining portions forming rockers 22, and terminal portions 23 extending upwardly behind the drum and terminating in rearwardly projecting wheelbarrow-type handles 24 which are laterally spaced. The wheelbarrow-type handles project rearwardly from the frame at points above the center of gravity of the frame. The portions 20 and 21 form an inverted, U-shaped section straddling the drum. The rockers 22 extend forwardly and upwardly from the supports 17 and their forward extremities 25 are curved upwardly and rearwardly, the forward extremities being beneath the lower edge of the open mouth of the drum when the mixer is resting in stable equilibrium as seen in Fig. 1.

A transverse axle 28 is journaled in bearings 29 mounted upon the rockers 22, between the supports 17 and the forward extremities 25. The shaft supports a widely spaced pair of pneumatic tire wheels 30 positioned just inside the rockers. The lower surfaces of the wheels project beneath the frame to such an extent that they engage the ground when the mixer is resting upon the supports 17, thus stabilizing the mixer when in operation. The mixer is easily tipped forwardly to be entirely supported by the wheels, with the drum still upwardly inclined. In this position the rockers 22 are more or less parallel to the ground, depending upon the angularity of the handles 24 and the height of the workman holding the handles and moving the mixer about. When the dumping point is reached the mixer may be inclined forwardly to a greater extent, thus shifting the weight to the forward extremities 25 of the rockers, which provide widely spaced, rocking supports upon which the mixer may be further tipped forwardly to discharge its contents.

An angle bar brace 33 is welded to the central portion 20 of the pipe, and an angle bar brace 34 is welded between the portions 23 of the pipe at their upper extremities, the two angle bars being welded to longitudinally extending brace members 35 which provide a support for a motor 36 arranged with its shaft extending longitudinally, parallel to the axis of the drum. The angle bars also support bearings 37 and 38 in which there is mounted a parallel shaft 39 supporting a large pulley 40 transversely aligned with a small pulley 41 on the shaft of the motor 36. The pulleys are connected by a belt 42. Shaft 39 is fixed to a sprocket 43 about which is trained a link chain 44 which passes around the cylindrical portion 15 of the drum, being confined in a flanged, annular track 45 concentrically mounted on the drum. A plurality of lugs 47 in the track 45 positively engage links of the chain so that it does not slip. The pulleys, V-belt, sprocket and roller chain comprise positive driving means drivingly connecting the motor to the drum for rotating the drum. The motor 36 is usually an electric motor provided with a power line cord 46 of sufficient length to permit movement of the mixer from its loading point to the dumping point. The motor could be any other motor mechanism such as an air-cooled gasoline engine.

An angle bar brace 50 extends laterally between the forward portions 21 of the pipe and supports a pair of rollers 51 having their axes parallel, laterally spaced from the center-line of the mixer and extending in the longitudinal direction. The rollers 51 fit into a flanged annular guide 52 fixed to and concentrically surrounding an intermediate portion of the frusto-conical section 14 of the mixing drum. The bottom wall 12 of the mixing drum mounts a central reinforcing pad 53 to which is welded a coaxially aligned, rearwardly extending trunnion 54. The trunnion extends through an opening in a channel bar brace 55 welded between the portions 23 of the pipe. Thrust bearing collars 56 and 57 are fixed to trunnion 54 on opposite sides of the web of the brace 55 so that the lower or rear end of the drum is rotatably supported and prevented from moving with respect to the frame when it is tipped forward to discharging or dumping position.

The drum is provided with one or more interior paddles 60 which lift and mix the materials deposited therein.

Having illustrated and described a preferred embodiment of the present invention, it should be apparent to those skilled in the art that the same permits of modification in detail and arrangement. I claim as my invention all such modifications as come within the true spirit and scope of the appended claims.

I claim:
1. A portable mixer comprising a drum having a continuous side wall arranged concentrically about a longitudinal axis, a closed bottom and an open mouth, a frame, means rotatably supporting said drum in said frame for rotation about its axis, drum rotating means including a motor mounted on said frame and means drivingly connecting said motor to said drum, said frame extending above and below said drum and comprising a pair of laterally spaced supports lying outwardly of the opposite sides of and below said drum for supporting said drum in stable equilibrium with its open end elevated whereby materials may be deposited in said drum and mixed therein, said supports defining a plane, a pair of rockers extending longitudinally forward from said supports parallel to the axis of said drum, said rockers having upwardly and rearwardly curved, transversely aligned, forward extremities, a laterally spaced pair of wheels mounted on said frame for rotation about a common transverse axis between said supports and the forward extremities of said rockers, said wheels projecting below said frame to said plane so that the drum may be supported solely by said wheels when tipped forwardly with its open end remaining elevated whereby the drum may be moved about while rotating and without dumping its contents, the forward extremities of said rockers extending forwardly of said wheels and solely supporting said drum when tipped forwardly to a greater extent whereby the contents of the drum may be dumped and a laterally spaced pair of wheelbarrow-type handles projecting rearwardly from said frame at points above the center of gravity of said frame.

2. The construction set forth in claim 1 in which said frame comprises a pair of pipe scections, one at each side of the drum, forming said rockers, said pipe sections extending vertically from said rockers above said drum and a terminal portion of each of said pipe sections projecting rearwardly at one side of the frame and above said drum to provide said pair of wheelbarrow-type handles for moving the mixer.

3. The construction set forth in claim 1 in which said frame comprises a single length of pipe including an intermediate U-shaped portion inverted over and straddling said drum, adjoining portions forming said rockers, and end portions extending upwardly and rearwardly to provide said pair of wheelbarrow-type handles.

4. The construction set forth in claim 1 in which said frame comprises a single length of pipe including an intermediate U-shaped portion inverted over and straddling said drum, adjoining portions forming said rockers and end portions extending upwardly and rearwardly to provide said pair of wheelbarrow-type handles, upper brace members connecting the bight of said U-shaped portion with said end portions and supporting said motor and driving means, and a plurality of transverse members connecting laterally spaced portions of said single length of pipe and supporting said drum.

References Cited in the file of this patent

UNITED STATES PATENTS

| | | |
|---|---|---|
| D. 185,844 | Yoger | Aug. 11, 1959 |
| 1,475,904 | Vandenplas | Nov. 27, 1923 |
| 2,247,083 | Garlinghouse | June 24, 1941 |
| 2,591,857 | O'Shea | Apr. 8, 1952 |
| 2,599,852 | McClain | June 10, 1952 |
| 2,808,241 | Beran | Oct. 1, 1957 |
| 2,859,950 | Graybill | Nov. 11, 1958 |

FOREIGN PATENTS

| | | |
|---|---|---|
| 121,424 | Australia | May 3, 1946 |
| 718,945 | Great Britain | Nov. 24, 1954 |